United States Patent [19]

Hait

[11] Patent Number: 5,581,763
[45] Date of Patent: Dec. 3, 1996

[54] SECURE ARCHITECTURE AND APPARATUS USING AN INDEPENDENT COMPUTER CARTRIDGE

[75] Inventor: John N. Hait, Missoula, Mont.

[73] Assignee: Progressive Technology Inc., Missoula, Mont.

[21] Appl. No.: 235,248

[22] Filed: Apr. 29, 1994

Related U.S. Application Data

[63] Continuation of Ser. No. 512,815, Apr. 23, 1990, abandoned, which is a continuation-in-part of Ser. No. 206,001, Jun. 14, 1988, abandoned.

[51] Int. Cl.$^6$ .................................................. G06F 13/00
[52] U.S. Cl. ............................................................ 395/186
[58] Field of Search ......................................... 395/650, 700

[56] References Cited

U.S. PATENT DOCUMENTS

| Re. 34,161 | 1/1993 | Nakagawa et al. | 273/85 G |
|---|---|---|---|
| 3,682,407 | 8/1972 | Lichtenstein et al. | 235/2 |
| 4,217,488 | 8/1980 | Hubbard | 359/112 |
| 4,262,329 | 4/1981 | Bright et al. | 380/4 |
| 4,277,837 | 7/1981 | Stuckert | 364/900 |
| 4,328,542 | 5/1982 | Anastas et al. | 395/775 |
| 4,430,728 | 2/1984 | Beitel et al. | 379/95 |
| 4,442,486 | 4/1984 | Mayer | 395/375 |
| 4,454,594 | 7/1984 | Heffron et al. | 395/375 |
| 4,462,076 | 7/1984 | Smith, III | 395/100 |
| 4,521,853 | 6/1985 | Guttag | 395/490 |
| 4,652,990 | 3/1987 | Pailen et al. | 380/4 |
| 4,725,977 | 2/1988 | Izumi et al. | 395/442 |
| 4,757,533 | 7/1988 | Allen et al. | 380/25 |
| 4,766,433 | 8/1988 | Herman et al. | 340/825.31 |
| 4,791,565 | 12/1988 | Dunham et al. | 395/575 |
| 4,802,217 | 1/1989 | Michener | 380/29 |
| 4,817,140 | 3/1989 | Chandra et al. | 380/4 |
| 4,870,605 | 9/1989 | Vo | 364/708.1 |
| 5,065,262 | 11/1991 | Blackborrow et al. | 360/75 |
| 5,086,923 | 2/1992 | King | 206/308.1 |

Primary Examiner—Kevin A. Kriess
Assistant Examiner—John O. Chavis
Attorney, Agent, or Firm—Leonard D. Schappert

[57] ABSTRACT

A portable secure computer architecture, apparatus, and method for protecting information and at least one program for controlling that information is disclosed comprising: a computer protected inside of a single sealed cartridge, the computer having a CPU, Memory, and a communications means for communicating with a host computer outside of the cartridge. All internal information and external communications are exclusively controlled by the internal program. Provision is also made for running a second program inside the architecture, while protecting secure information from that second program. Secure information is placed in a bank switched subdivision of memory. The subdivision is switched off by the information controlling program before the second program is permitted to run. Reactivating the protected subdivision causes a simultaneous non-maskable interrupt halting the second program and transferring control back to the first program.

4 Claims, 2 Drawing Sheets

SECURE ARCHITECTURE AND APPARATUS USING AN INDEPENDENT COMPUTER CARTRIDGE

REFERENCE CITED

This application is a continuation of application number 07/512,815, filed Apr. 23, 1990, abandoned, which is a continuation in part of application Ser. No. 07/206,001 filed Jun. 14, 1988, now abandoned.

| U.S. PATENT DOCUMENTS | | |
|---|---|---|
| 4,652,990 | 3/1987 Pailen et al. | 364/200 |
| 4,521,853 | 6/1985 Guttag | 364/200 |
| 4,328,542 | 5/1982 Anastas et al. | 364/200 |

FIELD OF THE INVENTION

The present invention is related to the safe and secure operation, transfer, and distribution of computer software and data. The present invention addresses three major security problem areas: software security, software physical security, and hardware security.

BACKGROUND OF THE INVENTION

Security problems arise during the use of software in computers whenever the host computer's architectural arrangement permits applications programs to be copied and/or altered. Pirates, whether they are "authorized" users or not, freely copy software for unauthorized sale and use. Software theft has become a multi-billion dollar illegal industry that is unstoppable by the prior art. Alteration of application programs by other computer programs also causes major computer security problems.

Rogue computer programs called "viruses" or "worms" alter software to produce unauthorized, undesirable, and often damaging effects. Such self-replicating secretly-operating programs are most often transferred from a rogue-contaminated computer into a new host computer by authorized operators who do not realize that these programs have entered by means of diskettes, modems or networks . . . and have attached themselves so as to lie hidden in unused areas of the host computer's data storage and active memory; integrated themselves into operating systems; and/or attached themselves to other host-stored applications programs. Once inside, a cleverly written rogue will pose a continuing threat from within the host computer, and is capable of compromising the security of anything that passes through the infected computer to any other computer, since it is able to copy, alter, destroy, and/or scramble any information that is electrically accessible to any other program operating in the host computer. As a result, rogue programs have been used successfully to circumvent security programs for espionage, sabotage, and extortion.

Copying and alteration is enabled by the basic architectural arrangement of prior art computers, which permits all host-run programs to have equal and unrestricted access to all of the host computer's resources including: mass data storage devices, console I/O; intercomputer communications; computer peripherals; and any prior art security device attached to the host computer. Typically, a copy of an applications program stored on a mass data storage device is down-loaded into the RAM of the host computer. Once in RAM, that program copy is able to be altered and/or copied to any host resource, because the host resources are directly controlled by the command coding of the program which is operating in the host computer's memory regardless of whether the program in operation is a well behaved program, or an insidious rogue program.

Mass data storage devices are an especially vulnerable resource, since host-loaded programs are able to command any information to be copied into RAM, altered or eliminated . . . including copies of other applications programs. Computers are unable to determine the intent of a program. Yet, no means is provided to prevent rogue-infected applications programs from accessing information directly. As a result, any program operating in the host computer's memory is able to avoid information-protecting security software; run any other software while monitoring its operation; and alter, copy, or destroy any information, (program or data,) that is electrically accessible to programs having a different intent. Even the prior art security devices and their controlling host-run security software are subject to rogue attack, since they require the use of secure, dependable host-run programs to maintain security . . . programs that are able to be altered by other (possibly contaminated) host-run applications programs.

To prevent rogue activity, a special architecture is required, wherein the operating system in the host computer is electrically separated from potentially contaminating applications programs, which are run in an independent, isolated computer, so as to prevent direct access the host computer's resources. However, the prior art does not provide such an arrangement. As a result, only secure, dependable, well-behaved programs are able to be used in computers needing security. This precludes using any, even remotely suspect program. It hampers the ability to test and upgrade software, severely limiting the ability to maintain adequate security.

No provision is made in the prior art to run suspect programs in an isolated architecture. There are no provisions for up-loading a suspected program into the security device itself without compromising security. There are no provisions for physical distribution of applications software within a protected architecture and apparatus, nor does it permit the actual operation of applications programs within the distribution means so as to eliminate any need for down-loading software.

A rogue program hidden WITHIN A PRIOR ART SECURITY DEVICE that is able to down-load information into the host computer, which in turn, is able to become a part of host-run programming code is easily able to compromise the information contained within the host computer. Such a security device must be manufactured by a friendly source, and once wired in, it must remain a permanent part of the host computer. Prior security devices do not have provisions to protect from replacement with an unfriendly "secure" program. As a result, the host computer is not protected from the security device, and the security device is not protected from the host computer.

Physical information security, that is, the ability to physically remove from a computer all existing copies of sensitive information, and lock them up in a safe or keep them under guard, is rendered moot by the ability of host computers to make security-compromising copies of stored information . . . with, or without the operator's knowledge. Means is not provided for physical security so that the only-existing-copy of an applications program is able to be physically removed from a host computer and kept in a safe until needed, because such devices are able to leave a security-compromising copy behind.

Processors, memories, inter-resource communications means, and component interconnections are security-sensitive. If security-sensitive components are physically accessible, unauthorized equipment is able to be attached to circumvent security measures. Sensitive information in prior security devices is not protected by dedicated security-sensitive components, which are both electrically inaccessible, and housed in a single sealed removable cartridge; so that sensitive information is protected no mater what kind of a computer it is plugged into, or who plugs it in. Removal of a prior art security device from the host computer does not remove these security-sensitive components simultaneously with the applications program, and other secret information, so as to enable physical information security to be affective.

Solutions to the above problems are not provided in the prior art as indicated in the following examples.

U.S. Pat. No. 4,652,990 of Pailen et al. discloses a user access control method, wherein a portable processor and ROM cartridge called a Key is provided with a means for connecting the Key memory to a Key Carrier Computer Bus, which is connected to a microprocessor within a security unit called a Key Carrier, which is connected between a host computer and a terminal to prevent access to the programs within the host computer by a person using that particular terminal. Authorized users insert their Key into the open bus structure of the Key Carrier. The host computer and the security unit then exchange information so that the program in the host computer is able to determine if authentication has been achieved. If so, the applications programs are then permitted to be run within the host computer.

Once an authorized user has been authenticated, he has access to applications programs which are down-loaded into the host computer. Since the Key's primary purpose is to determine authorization of those persons who are allowed to copy programs, no protection is provided to prevent any copying at all even by "authorized users". No provision is made to make copying of applications programs unnecessary by containing them in permanent ROMs within the Key cartridge. The authorized user is, as a result, able to make as many copies of the applications programs as he wishes . . . which enables him to become a pirate.

The Key system is lacking several features that prevent it from providing protection from rogue programs operating from within the host computer, and from copying by users, authorized or not. As is common in the prior art, the applications programs are located in the host computer, and the Key system is designed to simply prevent a user from accessing those programs. An electrical and architectural separation is not made between the security program running in the host computer and an isolated dedicated computer for the applications program, so as to protect the host computer's resources. The application program is not contained within the portable Key cartridge, which is lacking a RAM to permit an application program to actually run inside the cartridge rather than inside the host computer. Instead, the Key system relies on a special Key controller program that must operate within the host computer. This program complements the program running in the Key carrier. It is this host-run program that determines if authorization has been verified by the security apparatus, and permits access to the actual applications program down-loaded into the same host computer.

Damaging viruses are generally introduced inadvertently from a virus-contaminated applications program being run by an authorized user. Modern applications programs are quite complex, and even expert programmers have great difficulty in determining for sure that a given program is virus free, let alone the average software user. Since the Key system leaves the applications programs, including the security-controlling program inside the host computer, such programs are just as subject to viral attack from a contaminated program operating in the host computer, under the Key system, as with the rest of the prior art.

A virus, once operating within the host computer is able to attach itself to the Key controller program, record, duplicate or simulate any of the communications between the security device and the host computer, or simply permit access by an unauthorized person on a separate terminal. Such a rogue program is able to extract security information from other applications programs and permit their use, effectively bypassing the security system imposed. Once the virus program has gained program control, all of the host computer's resources are available to it, unprotected by the Key system.

Since the Key cartridge does not prevent applications programs from being copied by an "authorized user", the applications program is unable to be maintained as the only-existing-copy of said program. If the Key cartridge is locked up in a safe when the program is not being used, a thief is still able to break in and steal the host computer with the applications program inside; dismantle the computer; access the stored information directly; and disassemble the security program to determine how to circumvent it. The thief also is able to steal the diskettes or other storage devices that said program has been copied onto. As a result, the Key system docs not provide for the physical security of applications programs.

Additionally, the Key system is designed to cut off communications between a host computer and a terminal. Many modern computers have discarded terminals all together in favor of an integrated video-keyboard-computer such as the IBM personal computer. The Key system requires a remote terminal in order to cut off user access, and is as a result, not applicable to many of today's common computers.

U.S. Pat. No. 4,521,853 of Guttag discloses a method for protecting information contained in a memory which is on the same silicon chip as a microprocessor. Peripheral devices are prevented from accessing the on-chip memory through the common bus arrangement connecting the CPU with off-chip memory. This apparatus is designed to function as the main processor of the computer. It is wired into, rather than being an addition to host computers of various types. A standard bus arrangement is used that is not isolated from a host computer to prevent the addition of security-defeating equipment. Host resources are not protected from a rogue program being operated by this processor, as it is connected directly by its bus system to the host resources in the conventional manner. Rogue programs are able to gain entry into the host computer because the applications programs are run inside that same host computer, rather than within a secure cartridge and architecture.

Like the Key system referred to above, this arrangement does not provide for the physical security of applications software, nor does it provide a convenient and secure method for the distribution of software in a secure cartridge. The device is not designed to be removed from the computer and locked up in a safe at night, nor is the software protected from destruction by hostile environments.

U.S. Pat. No. 4,328,542 of Anastas et al. uses wired-in multiple processors that are designed for the implementation and secure operation of particular parallel programming algorithms. The type of security provided is to prevent interference between multiple applications by multiple processors working on common data, even using common programs in common memory. This method had been designed to operate using well-behaved, coordinated programs written for parallel processing. This method does not provide security in the sense that a not-so-well-behaved rogue program is to be prevented from tampering with or copying information in RAM or on mass data storage devices. This example of the prior art does not address the problem of rogue-contaminated programs being down-loaded into the parallel architecture from non-secure mass storage devices. The method uses access authorization registers, an elaborate system of mating hardware, and a specialized software structure to verify the authorization of applications programs to be used in the computer itself rather than providing a secure architecture with a separate processor and dedicated memory to run applications programs. Host resources remain accessible to all programs, including rogue programs that are able to gain entry by means of contaminated authorized programs.

SUMMARY OF THE INVENTION

It is therefore an object of this invention to provide a new secure computer architectural and apparatus system for preventing copying or alteration of protected information.

It is the further object of this invention to provide a means for the distribution of software which does not leave the secure computer architecture by being down-loaded into any other device. Said software being stored, transported, and operated inside of the secure architecture and apparatus.

It is the further object of this invention to provide a computer architecture whereby applications programs are electrically isolated so as to prevent direct access to host computer resources.

It is the further object of this invention to provide a computer architecture wherein applications programs that are not originally a part of protected information are able to be up-loaded into the secure architecture and apparatus, modified, and operated; while still preventing these up-loaded applications programs from directly accessing host computer resources, or even the original applications programs manufactured into said apparatus.

It is the further object of this invention to provide protection for security-sensitive components within a single cartridge housing, including: ROM and RAM memories, a dedicated processor, inter-device communications, and an isolated memory control, address, and data bus system to prevent the direct accessing of information in said protected memories except by said dedicated processor under the sole control of command instructions within said protected memories.

It is the further object of this invention to provide a means to allow security-sensitive components of the new architecture, along with protected information, all in a single cartridge housing, to be physically and simultaneously removed from the host computer and locked in a safe during periods of non-use in order to provide physical security for software and other information.

The system consists of a specialized computer architecture and apparatus having a specially selected portion contained within a special sealed cartridge, together called an Independent Computer Module (ICM). The ICM contains a fully functioning computer including: a CPU, RAM, ROM, a specialized memory switching means, and a communications port for providing a two-way communications link with a host computer, through a specialized interface. The host computer is fitted with a receptacle for holding the ICM, called an Interface Unit, which contains a matching interface, and a means for direct electrical connection to a communications port on the host computer.

The ICM is inserted into the Interface Unit. The host computer contains a program for communicating with the ICM that provides ICM-based programs with host-software-controlled access to the host's various hardware resources such as mass data storage, keyboard input, and video display. The applications program within the ICM requests the services of a host function by sending a function command, and any needed data, over the communications link. The host computer responds by accomplishing the requested function, in a manner similar to the way a conventional operating system (such as MS-DOS) provides such services to an applications program running in the host memory. However in this case, the operating system program returns any required response to the ICM through the communications link.

The operating system program does not need to authenticate authorized users in order to provide security, since primary security is provided by the architecture and apparatus, not by the software in the host computer.

In the prior art, it is common to have a wide variety of outside devices controlling computer memory, I/O, and even the CPU itself. Multiple programs are commonly loaded into memory, each having complete access to all of the host computer's resources. It is a major feature of the present invention that the ICM is a fully functioning computer, separate and isolated from the host computer, by the fact that there are no address or control bus connections between ICM components and the CPU of the host computer, or any other device outside of the ICM cartridge. Rather, the teachings of this invention require a two-way communications link that is always controlled by the cartridge-borne computer on one end, and the host computer on the other end. The ICM provides this controlled information transfer through a communications port, within the ICM cartridge. Control wires for this two-way communications port are only connected to the ICM-based CPU (other than conventional handshaking signals which only indicate the presence of information to be transferred and do not actually transfer said information into ICM or host memory.) This CPU is connected to no memory, except that which is contained within the ICM cartridge. As a result, the communications port will respond only to command-signals from the ICM-based CPU, which is activated by no command coding except those program codes which are contained in the ICM memory.

The direct result of this architecture is that ICM-based program commands are the exclusive means for controlling: 1. information transfer into and out of the ICM cartridge; 2. the addresses in ICM memory where input information is stored or output information is taken from; and 3. whether or not any such information ever becomes a part of ICM program command coding. Because of this centralized control, a specific routine within the ICM-based program to output or alter any portion of ICM-based information, including program code, is the one/method by which information in any ICM memory is able to be output or altered. In the absence of any such routine, no copy of said information is able to be provided to any outside device. Likewise, no input information is able to become a part of the ICM-based program code without a direct provision in the ICM program for including such as a part of its program code. Because of the new architectural arrangement, the ICM-based program is able to protect itself from alterations and copying. Note that new programming methods and electronic components are not required to implement such programming, or operate such a port, which is similar in operation to the common RS-232 type port in a conventional computer.

Listed below are a series of benefits that are produced as a direct result of this portion of the new architecture, and help explain why it actually produces greater security.

ICM-based programs are unable to be copied out of, or altered within the ICM cartridge without the use of specific preprogrammed routines that must be a part of the coding manufactured into the ICM. Barring any such routine inserted at the time of manufacture, ICM-based programs are unable to be copied or altered. As a result, ICM-based programs are unable to be pirated by authorized users, or successfully attacked by a rogue program such as virus or worm.

The ICM architectural system provides security for the host computer even from a rogue program that potentially is even able to be manufactured into an ICM. Such protection is provided for the same reasons the new architecture produces security for the ICM-based programs namely: a separate computer for the applications program, bus separation, and a host-controlled communications port. The host computer necessarily has to apply the same programming restrictions, namely: information down-loaded from an ICM is not to be used as program code within the host computer, and host-defined secret information is not to be up-loaded into an ICM—functions which are completely defined and controlled by the command structure of the host software. If the host computer is designed to use ICM programs exclusively, then the host computer is able to be kept clean of any viral contamination, because all applications programs are run inside ICMs rather than in the host computer.

The new architectural arrangement allows limits to be placed on ICM access to important host resources such as mass data storage, so that only information which the host operating system program is programmed to transfer are able to be. For example, the host program is able to allow the ICM-based program to read information from a disk file by name, but is able to prevent access to stored information by track and sector, such as a host-borne applications program is able to do. Such direct access to mass data storage is a common way in which virus programs are able to spread. By preventing direct track and sector access, the host computer is safeguarded from this type of rogue program attack.

The host program is able to restrict file access by an ICM-based program to authorized data files, and is able to prevent alteration, copying, or unauthorized use of host-run software. This prevents the program running in the ICM from circumventing any security provisions the host program imposes by directly accessing the hardware. Because of this, security is provided for both ICM and host. This method allows the host program to limit the activity of potential rogue programs that are able to be manufactured into an ICM, while protecting ICM programs from potential rogue programs in a host computer.

Another important portion of the new architecture is memory bank switching. This bank switching arrangement consists of a division of the ICM internal memory into at least two types of subdivisions called Executive Memory and General Memory; each is independently addressable. A means is included for selecting or not selecting the entire Executive Memory by turning on and off all read/write bus access to it. Access is turned off by the ICM-based CPU execution of a specific command from an ICM-based program. A latch is provided for holding the off state until access is resumed (turned on) by the execution of another specific direct program command from the ICM-based CPU. However, the command control signal which switches the Executive Memory back on is connected so as to simultaneously produce a non-maskable interrupt, that is, a forced program control jump to a fixed location within the secure Executive Memory. The two memory subdivisions are able to be made up of both RAM and ROM, however the secure Executive section has at least one portion constructed which uses a non-volatile ROM, and a portion of the General Memory subdivision is constructed using read/write RAM. This feature of the new architecture works harmoniously with the other features of the present invention in order to produce security results unavailable in the prior art.

The following sequence of programming events illustrate how this portion of the new architecture is used to produce enhanced security. As in conventional computers, upon power-up a restart signal initializes the program instruction pointer register of the CPU to a fixed starting address, where the initializing program begins. In the ICM, this fixed starting address is in the security-controlling program in the Executive Memory put into ROM during ICM manufacture. The secure program is then running, having the entire ICM memory protected by its bus isolation from the host computer, and available for use. Then, either because of a function request from the host computer to the ICM, or because of a needed of the secure program, a function command is issued by the ICM to the host computer to up-load program instructions of another, possibly non-secure, program. Up-loaded instructions are then written by the secure program into the RAM of the General Memory section, but are not yet executed as a part of any program instructions. Rather, the secure program issues a specific command to turn off the entire secure Executive Memory subdivision making the programs contained in it, electrically inaccessible to the ICM-based CPU, and any program in the General Memory. Only then is program control transferred to the up-loaded program. Upon completion of the up-loaded program, a specific command is issued by the up-loaded program, to turn the secure Executive Memory back on. Because of the new architecture, an automatic, simultaneous jump occurs in program control to a fixed address within the secure Executive Memory. The program coding which begins at this address, is able to examine CPU registers to determine if an allowable function request is underway, or is able to terminate the non-secure program. Not allowable functions for which no programming code is provided, include those requests which copy secret information into GENERAL RAM, down-load secret information to the host computer, alter secure programs, or transfer program control to a non-secure program while bypassing the required Executive Memory turn-off procedure above. If the non-secure program is terminated, then General Memory RAM is able to be overwritten, clearing it for secure use once again.

The actual program codes used to accomplish the above listed steps are a matter of the common programming art, and depend upon the ICM-based CPU type. But, the above sequence of events is required for the proper operation of the invention, which will then produce these direct results: Non-secure programs and subroutines are able to be up-loaded into the ICM and run without compromising the secure areas of ICM memory, because the secure Executive Memory is completely inaccessible to the ICM-based CPU when in the off state. Secure programming is able to resume without compromising security because program control is immediately transferred to a specific security routine in the secure Executive Memory. Secure-program-controlled communications are able to take place between secure and non-secure programs within the ICM.

The same security which is afforded the host computer from potential rogue programs in the secure portion of an ICM, as described above, is afforded to the host computer during the operation of non-secure, suspect, or any other program up-loaded into the ICM, for the same architectural reasons, namely: an independent applications-program-running computer, bus separation, controlled communications link, and selected programming which does not include security compromising routines in the host program. The host computer is able to prevent copying, alteration, or viral contamination of critical software. The host computer is still able to maintain its general purpose nature by running only the security operating system used to communicate with the ICM, operating only ICM-based programs, and/or by up-loading all other applications programs into the secure confines of the ICM.

It is an integral feature of the present invention that all of the security-sensitive components of the new architecture be sealed into a single removable cartridge. The cartridge provides portability, and the ability to interchange secure applications programs, while protecting the internal components from both damage, and security-circumventing additional bus connections. Important applications software actually run inside the cartridge, which is the actual means of providing physical software distribution, eliminating the need for program copies, and down-loading. The cartridge prevents physical access to the security-sensitive components, also to prevent altering and copying.

The cartridge portion of the invention directly provides security benefits that a simple cartridge does not provide for a conventional architectural arrangement. In the prior art it is common to connect a ROM within a cartridge directly to the host computer's data and address bus, or to down-load applications programs into the host computer for operation. This immediately puts this important information in jeopardy because a rogue program is able to be operating in the host computer, which then has direct access to the cartridge-borne information. In the present invention, secure programs are NOT DOWN-LOADED from tho ICM cartridge into any other device. As a result, the ICM-based information is able to be, and is able to maintain its status as, the ONLY-EXISTING-COPY of that secret information, which is UNABLE TO BE COPIED. The ICM cartridge is able to be physically removed from the Interface Unit, and as a result, from the host computer. Removal takes with the cartridge that only-existing-copy of the secret information, the applications program, the protecting CPU, memory, bus, and communications port. Altogether, all of the security-sensitive parts are able to be locked in a safe, or otherwise physically guarded, so as to provide physical security for both the ICM and its internal information. With conventional architectures, copies of cartridge-borne, or diskette-borne information are both easy to make and commonly made. As a result, locking up the conventional cartridge or diskette is of little or no value, because a security-compromising copy is able to exist outside of the cartridge.

Transferring the ICM cartridge to another host computer, simultaneously transports all of the security-sensitive components inside, and the security-controlling applications program in ROM. As a result, all software security requirements (such as passwords) are able to be enforced by the ICM itself at any time, on any host computer. If the cartridge were to fall into unauthorized hands, no specially constructed or programmed host computer is able to bypass the security provisions.

Certain programming methods are more suitable with certain CPU types. This transferability of the cartridge allows ICMs to be constructed using a wide range of CPU types, so that programs are able to be tailored to special needs without having to build an entire computer system to match. No special type of CPU is required within the host computer in order to run ICM-based programs, only similar resources. The result is that, the same ICM-based programs are able to be used, securely, on completely different host computers. Unlike the prior security apparatus, ICM applications programs are host-CPU-type independent.

The Interface Unit is necessary for the operation of the complete system, since it contains: a receptacle for holding the ICM; an interface for data communications; and provisions for wiring to the host computer.

Many aspects of security are addressed by the present invention to harmoniously produce enhanced computational ability along with improved software security, and physical security. Because electronic program storage methods are more reliable than mechanical ones (such as diskettes) and the ICM provides enhanced security in so many areas, using ICMs will enable a reduction in the over all number of actual copies of secure programs needed. ICM programmers will be more inclined to create fewer copies . . . in cases where multiple copies are even needed. The fewer number of secret information copies that there are in existence, the easier all security becomes.

DETAILED DESCRIPTION OF THE PREFERRED EMBODIMENT

Figure 1:
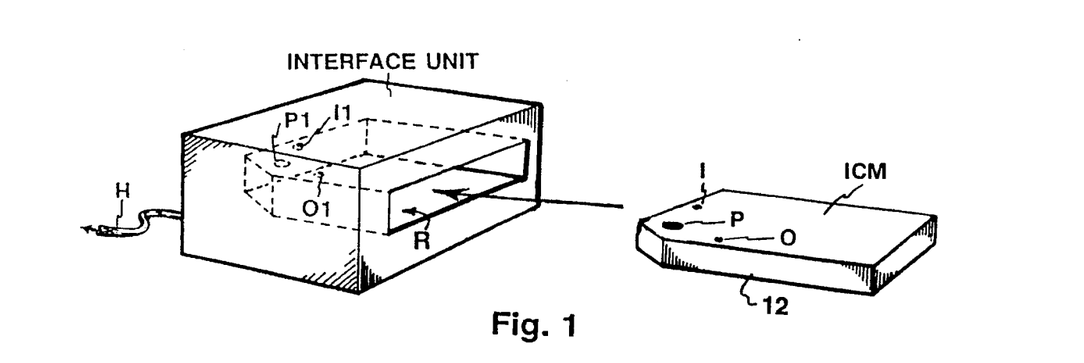
FIG. 1. An exterior perspective view of the Independent Computer Module (ICM) being inserted into an Interface Unit.

FIG. 1 depicts a perspective view of the present invention, with an ICM being inserted into the ICM holding receptacle R of an INTERFACE UNIT. The ICM has a connectorless interface comprised of an input sensor I, an output emitter O, and a power receptor P imbedded in the surface of the ICM cartridge. The INTERFACE UNIT has emitter I1, sensor O1, and power emitter P1 imbedded in its housing and positioned so that when the ICM is inserted, the ICM will be held so that matching emitter/sensor, and emitter/receptor pairs will be adjacent to each other as in FIG. 2. Wires H connect the INTERFACE UNIT to a host computer.

Figure 3:
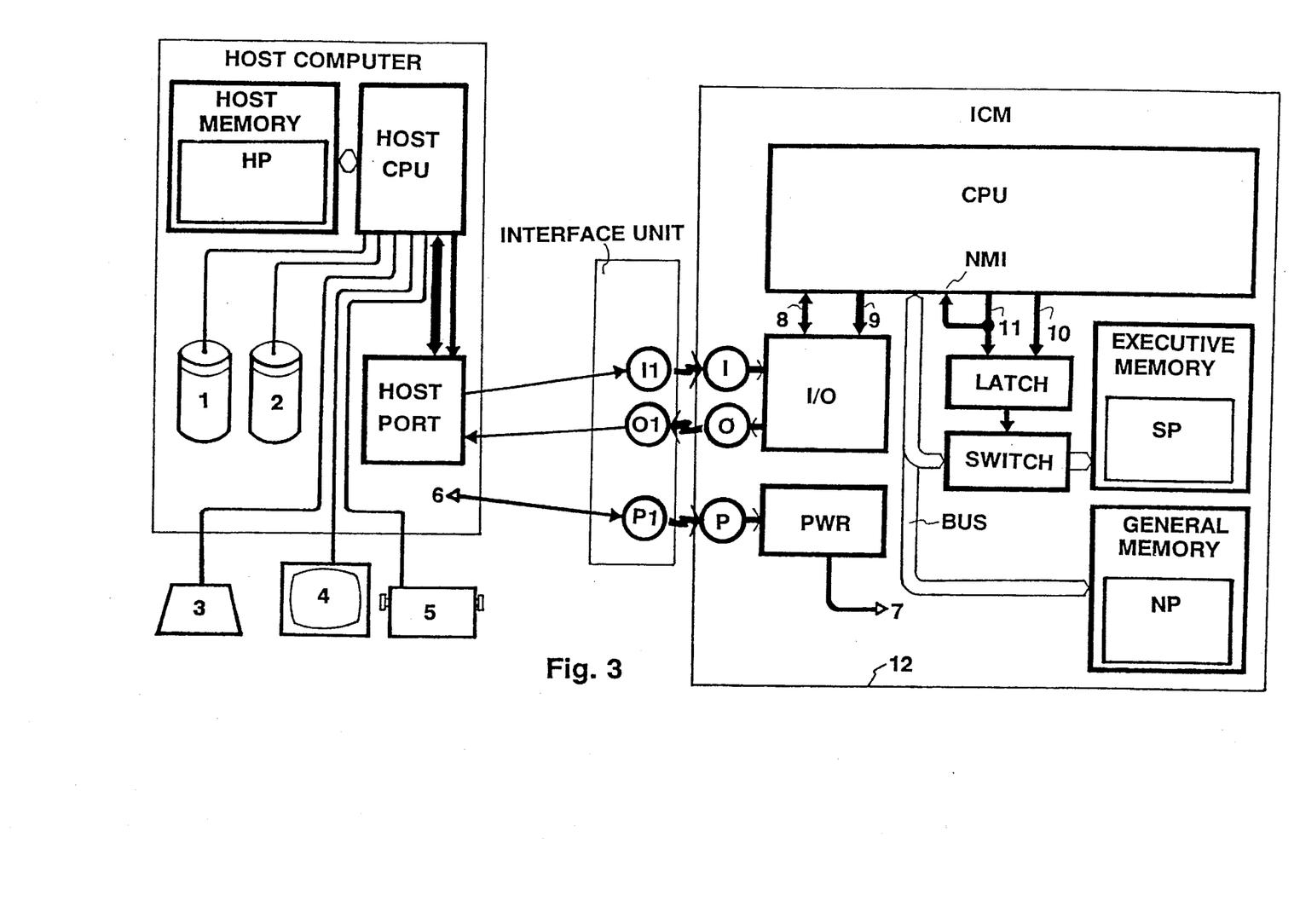
FIG. 3. A block diagram of the ICM with an Interface Unit connected to a host computer.

The ICM contains a fully functioning computer and at least one applications program connected to a host computer via the Interface Unit (see FIG. 3). When in operation the ICM is inserted into the Interface Unit The components of the interface facilitate sealing the ICM's cartridge housing 12, and the removal of the ICM. When not in use, the ICM is able to be locked in a safe or other physically secure location.

Figure 2:
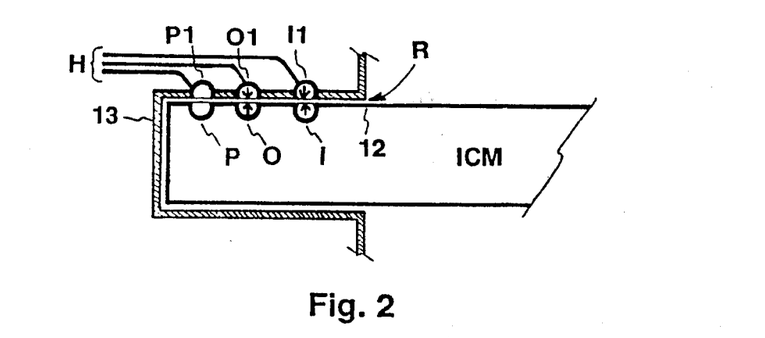
FIG. 2. A closeup sectional view of an ICM being held in a proper working position in an Interface Unit.

FIG. 2 depicts a closeup sectional view of an ICM, with its sealed housing 12, being held in place in the ICM holding receptacle R of the Interface Unit's sealed housing 13, so as to maintain the proper working relationship between the various parts of the interface. The ICM is held such that each emitter is positioned adjacent to its counterpart sensor or receptor in order to provide data communications, and energy to power the ICM. Power electro-magnetic emitter P1 is held near electro-magnetic receptor P; directional electro-magnetic emitter I1 is held near and aiming directly into directional electro-magnetic sensor I; electro-magnetic sensor O1 is held near and aiming directly into electro-magnetic emitter O.

Two way data communication requires at least one emitter/sensor pair for data input to the ICM, and at least one emitter/sensor pair to provide data output communications. However, more emitter/sensor sets are able to be added to accommodate all the data and handshaking signals of standard serial or parallel data ports if desired.

Direct wiring H connects the connectorless interface components in the Interface Unit with a host computer, and a power source.

The ICM has all of its components sealed inside the cartridge 12 with emitters, sensors and receptors sealed into the surface, or just under the surface of the ICM cartridge housing so the ICMs are able to operate normally while maintaining protection. The cartridge is manufactured using materials selected for protection of the in the particular environment the ICM is intended to be used.

FIG. 1 is a block diagram depicting the present invention connected to an input/output port (HOST PORT) of a HOST COMPUTER. The host computer's CPU (HOST CPU) is connected to several resources in the conventional manner, such as: a hard disk mass data storage device 1, a floppy disk 2, a keyboard 3, a video monitor 4, and a printer 5. The emitter I1 and sensor O1 of the communications portion of the interface in the INTERFACE UNIT are connected to the HOST COMPUTER via the data communications port, HOST PORT. An electric power 6, made in the conventional manner, is connected to the power emitter of the interface P1.

The ICM is shown inserted into the INTERFACE UNIT (as in FIG. 2) so as to position matching emitters and sensors/receptors adjacent to each other. Energy from P1 goes to interface receptor P which is connected to AC rectifier and filter (PWR), which in turn distributes power 7 to all of the various components within the ICM.

Interface emitter I1, and sensor O1 are physically located in the INTERFACE UNIT, and provide a two-way data communications link to the ICM. Emitter I1 and sensor I form an emitter/sensor pair for providing a data communications link input to the ICM. Emitter O and sensor O1 form an emitter/sensor pair for providing a data communications link output from the ICM. Emitter O and sensor I are physically sealed into the ICM cartridge and are connected to the input/output port, I/O. The I/O port has data connections 8, and port control lines 9 connected to the ICM-based CPU, such that the CPU provides the sole means of control for the I/O port.

The CPU is connected to two independently addressable subdivisions of memory, the EXECUTIVE MEMORY, and the GENERAL MEMORY. The GENERAL MEMORY is connected via a conventional BUS and at least one portion of its addressable range is made of read/write RAM. The EXECUTIVE MEMORY has at least one portion of its addressable range made of non-volatile ROM.

The EXECUTIVE MEMORY is connected through a bus on/off SWITCH. The SWITCH's state of being on or off is controlled by a memory-division-selection LATCH. The state of this LATCH is set or reset by two output lines 10 and 11. Line 10 is connected to a command-controlled CPU output which sets the LATCH upon the execution of a specific program command by the CPU; which in turn, turns off the bus SWITCH preventing all data and program access to the EXECUTIVE MEMORY. Line 11 is connected to a command-controlled CPU output which resets the LATCH; which in turn, turns the bus SWITCH on, resuming access to the EXECUTIVE MEMORY. Line 11 is also connected to a CPU input line which causes an automatic non-maskable interrupt, NMI, and program control jump to a fixed address in the EXECUTIVE MEMORY.

The following programming example illustrates the common operation of the various components of the new architecture. The conventional power-up reset signal to the CPU starts the security-controlling applications program SP in a section of ROM memory within the EXECUTIVE MEMORY. When the need arises, the ICM-based program SP issues a function request for access to a host resource such as reading data from a mass data storage device. The function request is made to the HOST COMPUTER by writing a function request command to the I/O port. The function request command is transferred through the connectorless interface emitter O to INTERFACE UNIT sensor O1, (in a serial fashion if only one emitter/sensor pair is used, and in a parallel fashion if multiple emitter/sensor pairs are in use as O and O1); to the HOST PORT. The host operating system program HP in the HOST MEMORY causes the HOST CPU to read the function request command from the HOST PORT, and then process that function request by accessing the requested data from mass data storage device 1, and then writing the data to the HOST PORT. The data in turn, goes through the connectorless interface of the INTERFACE UNIT, via emitter I1 to ICM sensor I, to the I/O port in the ICM. The secure ICM-based applications program SP then reads the data from the I/O port, and writes the data into the ICM RAM.

When a need arises to run a non-ICM-based program within the ICM, then, a function request is issued by the ICM-based program SP just as above, with the new program NP received back being stored in the GENERAL MEMORY RAM. The secure program SP is then able to examine, decrypt, or preform any other needed operation on the up-loaded information NP. When the security program SP has determined that the up-loaded new program NP is able to be operated, a small section of code containing a switching command to turn off the EXECUTIVE MEMORY is executed, immediately followed by a command control jump to the new program NP in the GENERAL MEMORY. This switching command activates the command-controlled CPU output line 10 which sets the memory selection LATCH. This LATCH controls the memory on/off SWITCH, which turns off all read/write access to the EXECUTIVE MEMORY. Program control is then turned over to the up-loaded program NP in the GENERAL MEMORY for running, which likewise is able use function request commands to the HOST COMPUTER as described above.

With the SWITCH held in the off position by the LATCH, the CPU is unable to read from or write to the EXECUTIVE MEMORY. During the off state, no program in the GENERAL MEMORY, rogue or otherwise, is able to access any of the secret information in the EXECUTIVE MEMORY. Such information is unable to be copied or altered, so that security is maintained during the entire time that non-ICM-based (including non-secure or even rogue programs) are running.

Upon completion of the up-loaded program, NP executes a command to resume access to the EXECUTIVE MEMORY, which activates the command-controlled CPU line 11; resetting the LATCH; turning on the on/off SWITCH; turning on access to the EXECUTIVE MEMORY. Also connected to line 11 is a non-maskable CPO input line NMI. The reactivation of the EXECUTIVE MEMORY, along with the simultaneous activation of this NMI input line causes a program control jump to a fixed address within the EXECUTIVE MEMORY. Because of this, secure program control is simultaneously resumed, preventing any non-secure program in the GENERAL MEMORY from exercising program control when the EXECUTIVE MEMORY is accessible.

The entire two-way communications link between the HOST COMPUTER and the ICM is completely controlled by the host program HP on one end, and either SP or NP operating inside the ICM on the other end. This architectural arrangement of the apparatus prevents any program operating in one computer from directly accessing any information in the other computer without such action being controlled by the program operating in the target computer. No information is able to be transferred from one computer to the other without an express provision for such transfer within the outputting computer. No programming code is able to be run within either of the computers without an express provision within the initial program inside the target computer. No information is able to be altered within either computer without an express program provision within the target computer to accomplish the alteration.

No secret information is able to be copied out of the ICM, and no information is able to be altered within the ICM at the direct command of any program operating within the HOST COMPUTER. The HOST COMPUTER, all of the information stored in the HOST MEMORY, and the host resources 1 through 5, are completely under the control of program HP, and are unable to be directly copied or altered by any program operating in the ICM. As a result, the ICM is protected from copying and/or alteration by any rogue program in the HOST COMPUTER, and the HOST COMPUTER is protected from any rogue program operating in the ICM.

All of the security-sensitive components including the CPU, I/O, I, O, P, PWR, BUS, LATCH, SWITCH, EXECUTIVE MEMORY, and GENERAL MEMORY are contained within the single sealed cartridge housing 12 to prevent access to these components either during operation, or during periods of non-use. As a result, the secure program SP is able to be maintained as the only-existing-copy of said secure program so that removal of the cartridge 12 from the INTERFACE UNIT simultaneously removes all of the security sensitive components as well as the secure applications program SP. So that together, they all are able to be locked in a safe, or otherwise made physically secure, when not in use.

What is claimed is:

1. A portable secure computer architecture for protecting information and at least one program for controlling said information, comprising: a single sealed cartridge and a computer contained within said cartridge, said computer having a central data processing means, memory means controlled by said central data processing means, information within said memory means, at least one program within said memory means which controls said central data processing means, and a connectorless communications means for providing communications into and out of said architecture, said single sealed cartridge insuring physical integrity of said computer contained within said single sealed cartridge and to provide convenient handling and portability enabling said portable secure computer architecture to be made physically secure when unused such as by being locked in a safe, said connectorless communications means facilitating portability of said single sealed cartridge and portable operation of said at least one program, said connectorless communications means being the sole means for transferring information into or out of said architecture to prevent said information and said at least one program from being accessed by any other means outside of said cartridge, said central data processing means having exclusive control over all information transfer into and out of said connectorless communications means to prevent said connectorless communications means from being used by some other means outside of said cartridge for accessing said memory means uncontrolled by said at least one program, thereby providing security by controlling all said information and said at least one program within said portable secure computer architecture exclusively from within said portable secure computer architecture.

2. The invention of claim 1 wherein said memory means contains a first program and said memory means includes a first subdivision containing information to be made secure and a second subdivision containing a second program, a means to prevent said second program from altering said first program to prevent said second program from using an altered first program to gain access to said information to be made secure, and switching means for activating and deactivating said first subdivision, said switching means having:
deactivating means for deactivating said first subdivision upon said switching means receiving a first command controlled signal from said central data processing means during the operation of said first program to prevent said second program from accessing said information to be made secure in said first subdivision later when said second program is operating in said second subdivision, and
activating means for simultaneously activating said first subdivision upon said switching means receiving a second command controlled signal from said central data processing means, and causing a hardwired command control jump to said first program, which transfers program control to said first program, and halts said second program to prevent access of said information to be made secure in said first subdivision by said second program following activation of said first subdivision, thereby enabling operation of said second program within said portable secure computer architecture while protecting said information to be made secure within said first subdivision from said second program by forcing a hardwired command control transfer to said first program preventing said second program from reading, altering, or directly accessing said information to be made secure, while making said information to be made secure available to said first program.

3. A method of providing security for information, and at least one program for controlling said information, within a computer architecture comprising:

providing a single sealed cartridge;

positioning in said single sealed cartridge a computer having a central data processing means, a connectorless communications means for providing communications into and out of said single sealed cartridge, memory means controlled by said central data processing means, said memory means containing information and said memory means containing at least one program for controlling said central data processing means;

said positioning of said computer in said single sealed cartridge insuring physical integrity of said computer, said connectorless communications means facilitating portability of said single sealed cartridge and portable operation of said at least one program;

said connectorless communications means being the sole means for transferring information into or out of said architecture to prevent said information and said at least one program from being accessed by any other means outside of said cartridge;

said central data processing means having exclusive control over all information transfer into and out of said connectorless communications means to prevent said connectorless communications means from being used by some other means outside of said cartridge for accessing said memory means uncontrolled by said at least one program;

utilizing said at least one program to control said central data processing means, and utilizing said at least one program to control said connectorless communications means and all passage of information into and out of said computer, whereby said at least one program exclusively controls all said information within said single sealed cartridge from within said single sealed cartridge, providing unbreachable control from within said computer architecture thereby securing said information within said computer architecture.

4. The method of claim 3 including:

providing within said memory means a first program and a first subdivision containing information to be made secure, a deactivating means for disabling access to said first subdivision controlled by a first command controlled signal from said central data processing means, an activating means for enabling access to said first subdivision controlled by a second command controlled signal from said central data processing means, and a hardware command control jump to said first program every time said first subdivision is activated by said second command controlled signal, utilizing said first program within said memory means for controlling said information to be made secure by controlling said central data processing means when said first program is in operation, providing a second subdivision, a second program within said second subdivision for controlling said central data processing means when said second program is in operation, and a means to prevent said second program from altering said first program to prevent said second program from using an altered first program to gain access to said information to be made secure, commanding said central data processing means, from said first program, to disable said first subdivision preventing access to said information to be made secure in said first subdivision, transferring program control from said first program to said second program, and commanding said central data processing means to simultaneously enable said first subdivision, halt said second program, and return program control to said first program, thereby providing a method of operating said second program within said computer architecture while protecting said information to be made secure within said first subdivision from said second program by forcing a hardwired command control transfer to said first program preventing said second program from reading, altering, or directly accessing said information to be made secure, while making said information to be made secure available to said first program.

* * * * *